United States Patent [19]

Higashi

[11] Patent Number: 4,581,827
[45] Date of Patent: Apr. 15, 1986

[54] CAR DOOR MIRROR EQUIPPED WITH BEARING MAGNETOMETER

[75] Inventor: Manabu Higashi, Yamatoshi, Japan

[73] Assignee: Niles Parts Co., Ltd., Tokyo, Japan

[21] Appl. No.: 680,919

[22] Filed: Dec. 12, 1984

[30] Foreign Application Priority Data

Sep. 25, 1984 [JP] Japan ............. 59-144494[U]

[51] Int. Cl.$^4$ .............. G01C 17/04; G02B 5/08
[52] U.S. Cl. .................... 33/333; 33/355 R; 350/600
[58] Field of Search ............. 33/333, 334, 349, 354, 33/355 R, 364, 264; 350/600, 606, 631

[56] References Cited

U.S. PATENT DOCUMENTS

| D. 162,098 | 2/1951 | Vacanti | 350/600 |
| 1,528,082 | 3/1925 | Schlaich | 350/600 |
| 3,276,137 | 10/1966 | Lore | 33/354 |
| 3,286,358 | 11/1966 | Smokowski | 33/364 |
| 4,309,828 | 1/1982 | Sakamoto | 33/333 |
| 4,402,140 | 9/1983 | Nagae | 33/334 |

FOREIGN PATENT DOCUMENTS

| 1555783 | 5/1970 | Fed. Rep. of Germany | 350/600 |
| 2606692 | 8/1977 | Fed. Rep. of Germany | 350/600 |
| 1527323 | 4/1968 | France | 33/364 |

Primary Examiner—Richard R. Stearns
Attorney, Agent, or Firm—Ronald P. Kananen

[57] ABSTRACT

A compass attached to a car door mirror is disclosed which provides protection for the compass and improved readability, while avoiding the reliability problems of compasses mounted inside the car. The compass is embedded in the frame of the car door mirror which makes it both less obtrusive and physically more secure.

8 Claims, 5 Drawing Figures

CAR DOOR MIRROR EQUIPPED WITH BEARING MAGNETOMETER

FIELD OF THE INVENTION

The present invention relates to compasses for use by automobile drivers. More particularly, the present invention relates to mountings for such compasses.

DESCRIPTION OF THE PRIOR ART

Heretofore, a compass, that is to say, a bearing magnetometer for use in a car, has been attached to the car's instrument panel or the rearview mirror above the instrument panel at a relatively easy-to-see position for the car driver. However, in such a position the magnetic shielding effect produced by the car body causes erratic operation of the compass, that is, the compass will sometimes fail to indicate the heading of the car correctly. Further, the installation of said compass on the instrument panel is inconvenient in that a rearrangement of the other instruments may be necessary to preserve their accessibility. Whether installed on the instrument panel or above it, these compass mountings produce an odd-looking result and also, upon occasion, an unstable attachment of the compass to the car.

On the other hand, when the compass is merely attached to the outer frame of the car door mirror the compass is seen obliquely from the driver's position and so, the driver has difficulty in determining the car's heading accurately. Also, compasses merely attached to the frame of the door mirror are subject to theft and vandalism. The present invention overcomes these disadvantages inherent in the previously-known automobile compasses.

SUMMARY OF THE INVENTION

A car equipped with a compass allows a car driver to be conscious of the compass heading of the car. This invention provides improved compass reliability by integrating the compass into a door mirror protruding outward from the car body to a position where the compass is directly influenced by the earth's magnetic field but subject to reduced spurious magnetic influences interfering with its operation.

In accordance with the present invention a compass is provided that is adapted to be embedded in the outer frame of a door mirror mounted on a car door or the door frame. This compass contains a magnetic body that is freely rotatable to detect magnetic north. The magnetic body carries bearing indications that indicate the location of magnetic north relative to the direction in which the car is traveling, the car's heading.

An index line is provided that indicates the exact heading of the car. The index line allows the driver to quickly ascertain the car's current heading by merely glancing at the compass. A compass constructed in accordance with the present invention permits adjustment of the location of the bearing marks indicating the points of the compass, i.e., south, north, east and west, that appear under the index mark to correct for the inherent reading error produced by the fact that the driver's angle of view is oblique to the heading of the car.

The compass is also mounted on the outer frame of the door mirror in a covering that does not come off easily, to protect the compass from foolish acts by pedestrians. Thus, the structure provided by the present invention enables the door mirror to be utilized for mounting a compass on the car without the risk of loss or damage described above while providing a reduction in the magnetic distortion affecting the compass.

BRIEF DESCRIPTION OF THE DRAWINGS

The nature and advantages of the present invention will be better understood when the detailed description of an embodiment of the present invention given below is considered in conjunction with the drawing provided, wherein.

DESCRIPTION OF THE PREFERRED EMBODIMENT

Figure 1:
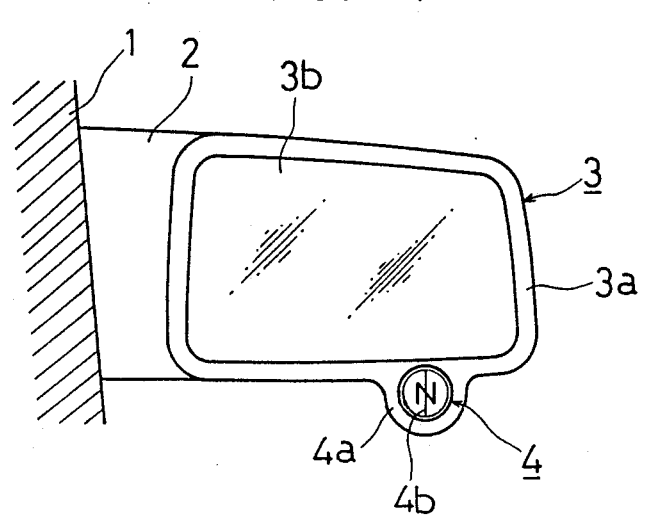
FIG. 1 is a partially cutaway elevational view showing the basic construction in accordance with the preferred embodiment of the present invention.

FIG. 1 shows a door of a car 1, attached through a link 2 to a door mirror assembly 3. A compass 4 substantially comprising a magnetic body 4a, and a vertical index line 4b in a convenient location in front of said magnetic body 4a, is embedded into an outer frame 3a of the door mirror assembly. Said magnetic body 4a is mounted in the compass in a freely rotatable manner.

A driver operates a car while carefully observing the changing traffic conditions and, in particular, watching the reflection showing cars coming up behind his car on mirror face 3b of the door mirror assembly. It is also desirable for the driver to be able to check the heading of the car at any time for driving to the destination in an efficient way. Visual confirmation of his heading is provided by the letters "N", "S", etc., which provide bearing indications on the magnetic body 4a of the compass 4 on the car door, in accordance with the present invention.

In FIG. 1, for instance, the index line 4b is over the bearing indication letter "N"; thus, the driver is informed that the car is heading north. Providing that the car's heading is in accord with the bearing of the destination, the driver may continue in that heading or, if the car's heading and the bearing of the destination are not consistent, the driver may correct the car's heading accordingly. When the heading of the car changes, the magnetic body 4a of the compass 4 rotates according to the change in the car's heading, moving the index line toward "E" (east) or "W" (west) in the example. Being able to verify a new heading every time the heading of the car changes enables the driver to operate the car smoothly and navigate efficiently, thus minimizing travel time.

Figures 2A, 2B:
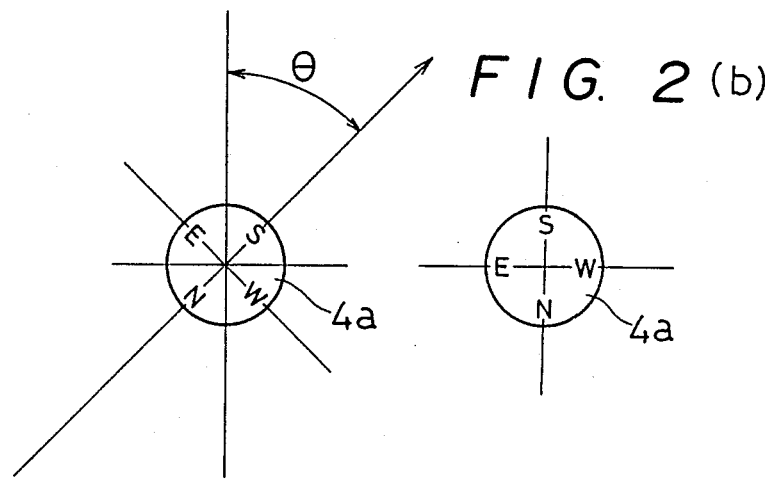
FIG. 2(a) is a schematic diagram showing the position of the bearing indication letters on the magnetic body when they have been set at an oblique angle $\theta$ from the car's direction of travel.
FIG. 2(b) is a schematic diagram showing the positions of the bearing indication letters on the magnetic body when they have been set to coincide with the car's direction of travel.
Figure 3:
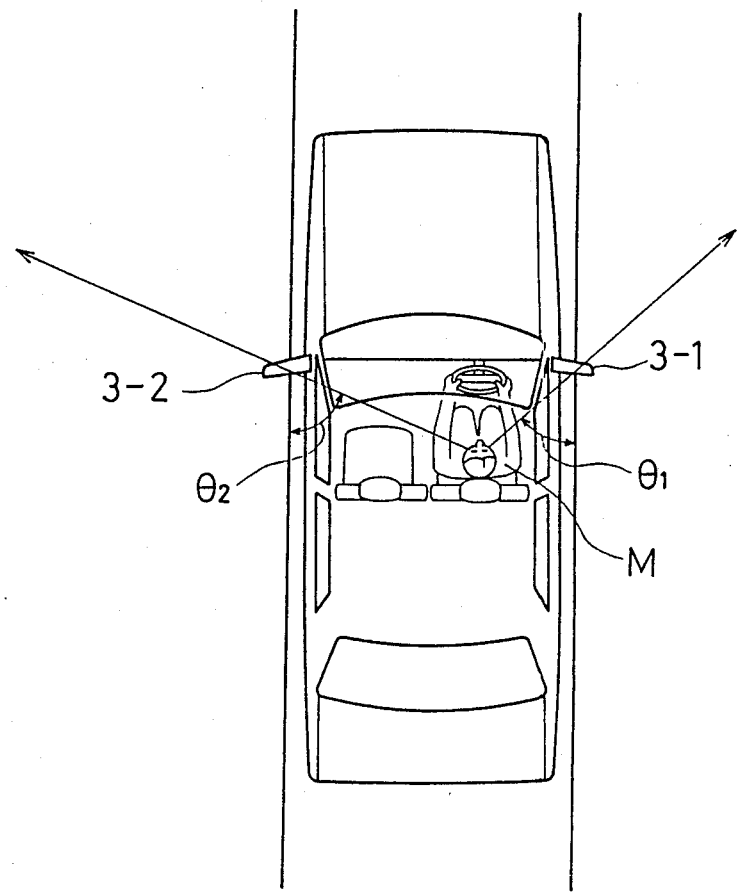
FIG. 3 is a schematic diagram showing the inclination of the driver's angle of view with respect to the car's direction of travel.

As shown in FIG. 3, the angle of view of driver M has an inclination of angle $\theta_1$ relative to the advancing direction of the car at the right-hand door mirror 3-1 and also a similar inclination $\theta_2$ at the left-hand door mirror 3-2. Generally, since the driver M sits on a right-side seat, the angle $\theta_2$ is larger than $\theta_1$. It has been experimentally determined that 30° to 40° is a suitable range for $\theta_1$ and $\theta_2$. To compensate for this inclination, the position of the bearing indication letter on the magnetic body 4a of the compass 4 fitted to the door mirror 3 is shifted by an angle $\theta$, as shown in FIG. 2(a), which permits the driver M to read the indicated heading accurately. When the compass 4 is attached to the right-hand door mirror 3, is desirable to set to the angle $\theta = \theta_1$. When it is attached to the left-hand door mirror 3, it is preferable to shift the letters in a direction opposite to the direction in which they ae shifted on the right side, and to make the angle $\theta = \theta_2$.

Figure 4:
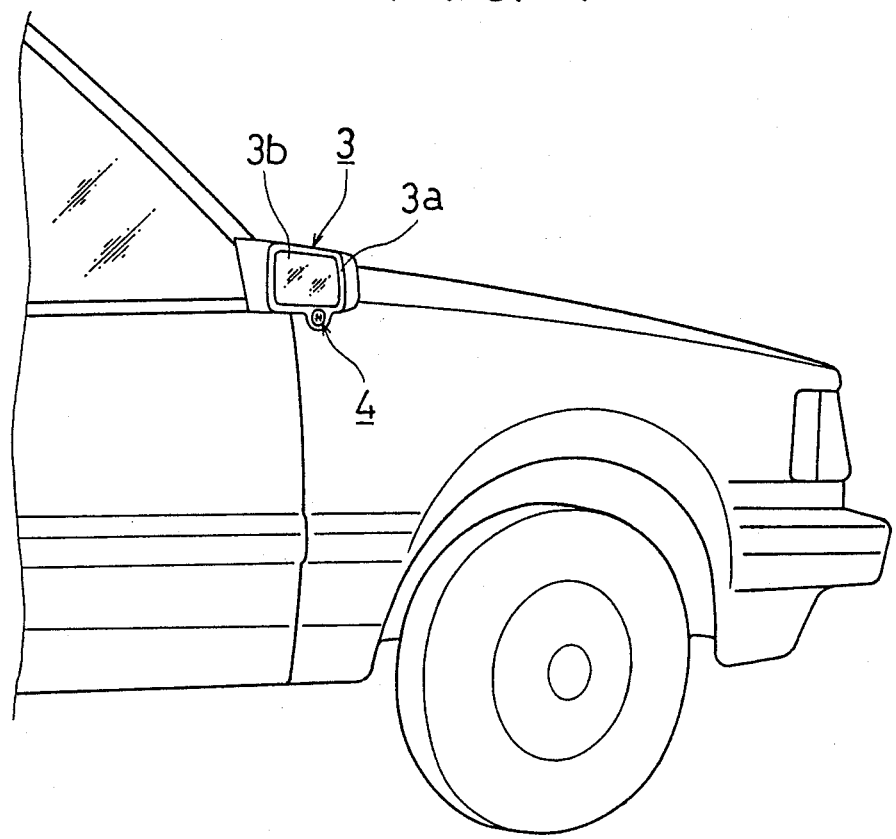
FIG. 4 is a perspective view of the door mirror assembly.

Since the door mirror 3 protrudes out from the car body, there is forever a danger of the mirror being broken off or otherwise vandalized by passersby. To reduce this risk, the compass is embedded in the outer frame 3a of the door mirror, making the compass as inconspicuous as possible, as shown in FIG. 4. The reader will note that this compass is shown mounted on the right-hand door in FIG. 4. It can be mounted on the left-hand door in a like manner.

The present invention provides a compass adapted to be attached to the outer frame of the door mirror. This permits the compass to be placed outside the car body and, so effectively reduces the magnetic shielding effect produced by the car body. By improving the reliability and readability of the compass, the present invention contributes to efficient car operation by the driver. Further, the present invention provides an accurate visual indication of the car's heading because the position of bearing indications on the magnetic body of the compass has been conformed to the angle of view between the driver and the door mirror.

Finally, the embedment of the compass into the car door mirror assembly provides protection against foolish acts by malicious persons, since the compass is both inconspicuous and securely mounted when mounted in accordance with the present invention.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

I claim:

1. In a vehicle having a vehicle body defining a driver location and at least one rear view door mirror assembly located outside of said vehicle body and linked to said vehicle body within view of a vehicle driver located at said driver location, the improvement comprising the combination of a direction-indicating magnetic compass on said rear view mirror, said compass defining a magnetic body influenced by the magnetic field of the earth for indicating a compass direction and located within a frame for said mirror but external to said mirror within said frame and at a distance from said vehicle body to reduce the influence of magnetic effects from metal in the body of said vehicle, and a bearing mark located on said compass for indicating at least one compass direction and arranged to be visible to a driver located at said driver location so that the driver is enabled to accurately view directly the direction of travel of said vehicle when viewing said rear view door mirror from the angle of inclination of said driver to said mirror.

2. The improvement as set forth in claim 1, wherein said rear view door assembly comprises an outer frame for a rear view mirror, said magnetic compass being located within said outer frame outside of said rear view mirror.

3. The improvement as set forth in claim 1, wherein the location of said rear view mirror defines a first angle of inclination relative to an advancing direction of said vehicle, the position of said bearing mark on the compass compensating for said first angle of inclination to permit the driver to view accurately the indicated heading.

4. The improvement as set forth in claim 3, wherein said position of said bearing mark is shifted in a first direction when said rear view door mirror is mounted on the right side of said vehicle and in a second opposite direction when said rear view door mirror is mounted on the left side of said vehicle, thus conforming the angle of view to a driver of the bearing mark on said compass to the angle of view between the driver and the door mirror.

5. The improvement as set forth in claim 1, wherein said first angle of inclination is within a range of about 30° to about 40°.

6. In combination, a rear view door mirror assembly, structurally adapted to be linked exteriorly to a door of a vehicle having a vehicle body defining a driver location, and located at a position remote from the body of said vehicle at a location proscribing a view for a driver of said vehicle located at said driver location at a first angle of inclination; and a freely-rotatable compass defining a magnetic body influenced by the magnetic field of the earth for indicating a compass direction of travel of said vehicle, said compass being located in a frame for said rear view door mirror at a distance from said vehicle body to reduce the influence of magnetic effects from metal in the body of said vehicle, said compass further including a bearing mark indicating at least one compass direction arranged to be visible to the driver located at said driver location within said vehicle so that the driver is able to accurately view directly the direction of travel of said vehicle when viewing said rear view door mirror.

7. The combination as set forth in claim 6, wherein said bearing mark is located relative to said compass at a position which compensates for said first angle of inclination to permit the driver to view accurately an indicated heading when viewing the rear view door mirror at said first angle of inclination.

8. The combination as set forth in claim 7, wherein said first angle of inclination is on the order of 30° to 40°.

* * * * *